United States Patent [19]

Franco et al.

[11] Patent Number: 4,759,197
[45] Date of Patent: Jul. 26, 1988

[54] MACHINE FOR MAKING ICE CREAMS, IN PARTICULAR STICK-SUPPORTED ICE CREAMS

[75] Inventors: Grigoli Franco; Trabacchi Franco, both of Milan, Italy

[73] Assignee: Sidam S.r.l., Cormano, Italy

[21] Appl. No.: 57,225

[22] Filed: Jun. 1, 1987

[30] Foreign Application Priority Data

Jun. 9, 1986 [IT] Italy ................................ 20717 A/86

[51] Int. Cl.[4] .............................................. A23G 9/10
[52] U.S. Cl. ..................................... 62/345; 425/261; 425/436 R; 426/389; 426/515
[58] Field of Search ............. 62/345, 356; 425/126 S, 425/261, 436 R; 426/389, 421, 515, 524

[56] References Cited

U.S. PATENT DOCUMENTS

| | | | |
|---|---|---|---|
| 3,031,978 | 5/1962 | Rasmusson | 62/345 X |
| 3,695,895 | 10/1972 | Brown | 62/345 X |
| 4,352,830 | 10/1982 | Bilett et al. | 62/345 X |
| 4,548,572 | 10/1985 | Waldstrom | 62/345 X |
| 4,576,562 | 3/1986 | Anderson | 62/345 X |

*Primary Examiner*—William E. Tapolcai
*Attorney, Agent, or Firm*—Michael J. Striker

[57] ABSTRACT

A machine for making ice creams, in particular ice creams of the stick-supported type, comprising a freezing tank through which parallel arranged rows of molds are made to progress intermittently under control of a pull chain, dosing, stick-inserting and product-lifting-up units. The pull chain is designed to be moved by an at least double step. The freezing tank is conveniently elongated in shaped, and the different units have double elements whereby a double productivity of the machine can be obtained, with the number of advances per minute being equal.

12 Claims, 2 Drawing Sheets

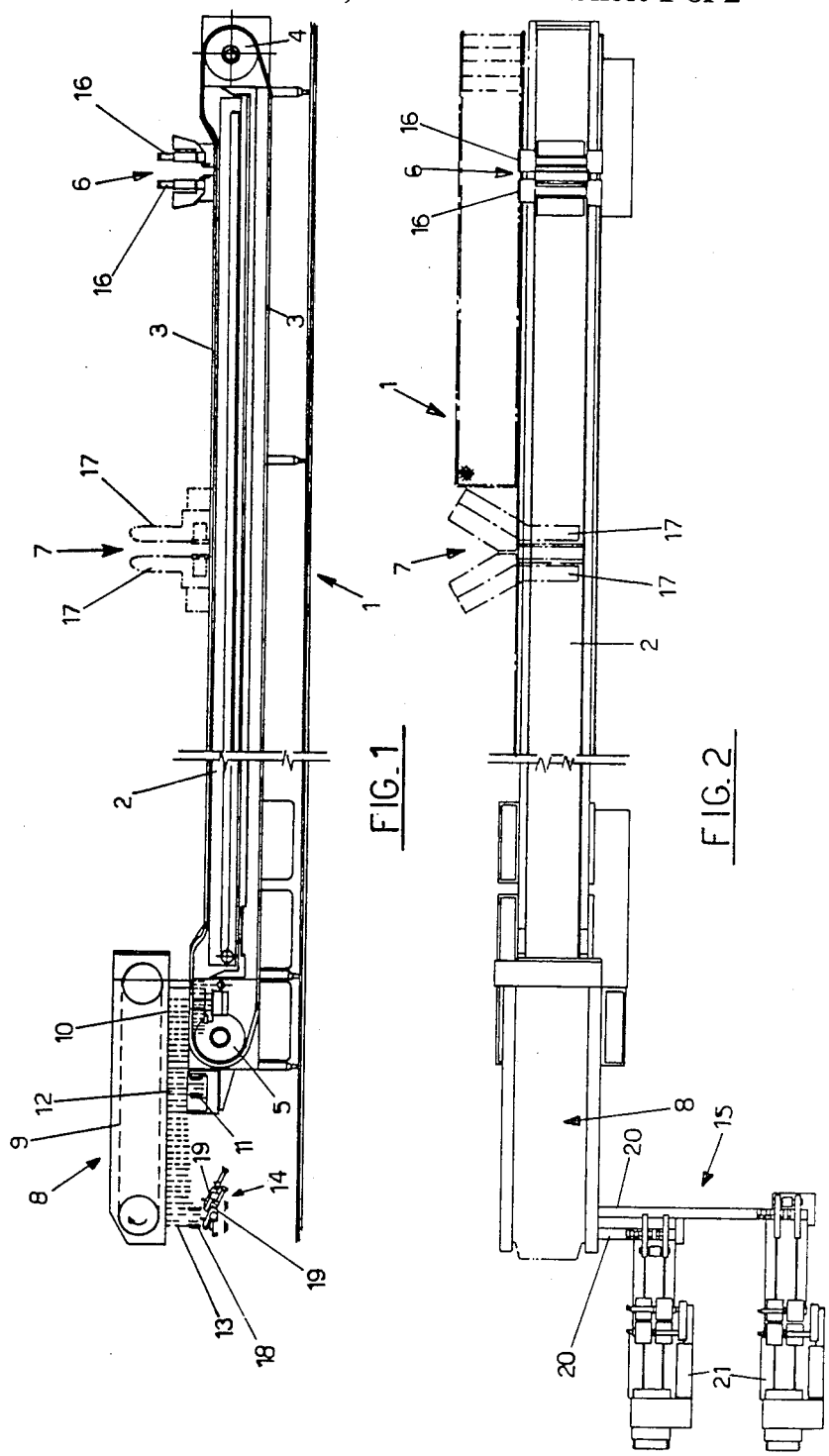

MACHINE FOR MAKING ICE CREAMS, IN PARTICULAR STICK-SUPPORTED ICE CREAMS

BACKGROUND OF THE INVENTION

This invention relates to a machine for producing ice creams, particularly stick-supported ice creams, such as 'icicles' or ice dollies, sorbets and the like.

An ice cream machine of this type generally has a number of moulds arranged in parallel rows, which are caused to advance intermittently through a freezing tank by means of a pull chain. At an initial part of said freezing tank, there is provided a dosing means which, at the commencement of a cycle, injects a given quantity of product, in a liquid state, in the molds of each mould row.

Placed at an intermediate location of the freezing tank is a stick-inserting device which is arranged to insert sticks in the moulds of each mould row when the product commences to solidify therein.

At the exit from the freezing tank there are drawing rods which operate, in turn, intermittently under control of a pull chain, to draw the frozen products out of each row of moulds and then release them for delivery to a paper wrapping system.

At present, a stringent need exits for an increased productivity of these machines, which productivity is measured in terms of number of shots per minute, where the term "shot" is intended to mean one advance, or step forward, of the mold-pulling chain, which corresponds to one dosing operation, one stick-inserting operation, one drawing-out operation and one release operation. In particular, the drawing-out operation comprises a one-step advance of the pull chain for the drawing-out rods, one downward movement of a drawing rod and one upward or return movement of same rod.

Thus, to-day's ice cream machines have a productivity limit, in terms of shots per minute, which cannot be exceeded for mechanical reasons, such as inertia of individual parts, the minimum time lengths necessary for the different elements to complete their movement between a shot and the subsequent one, and so on.

In particular, this mechanical limit is imposed mostly, though not exclusively, by the frozen product-drawing-out operation which requires, between one shot and the further one, as mentioned above, a one-step advance of the pull chain for the drawing-out or lifting-up rods, the descent of one said rod for positioning it over a row of moulds containing the frozen products ready for removal, and the ascent of same rod.

On the other hand, it is inconceivable for these machines to be operated near said upper limit which would lead all of their mechanical parts to work under highest stress conditions with the risk of failure being considerably increased. Thus, an effort has been made towards increasing the width of these machines in order to have a greater number of molds per mold row but, in this case too, a given number of molds per mold row cannot be exceeded both in view of the fact that operators controlling operation of the machine on either side thereof are to be enabled to have the centerline zone of the machine within their reach to take measures there, if necessary, and in order to prevent cooled brine from being irregularly distributed inside the tank which would lead to differences in freezing of the products.

There exists, thus, a problem long unsolved in the ice cream machine art, that is to increase productivity of these machines by overcoming the above described mechanical limit.

SUMMARY OF THE INVENTION

It is an object of the present invention to provide a solution for this apparently unsolvable technical problem by practically doubling the productivity of an ice cream machine without interfering with its number of shots per minute thereby to keep the various machine elements below their mechanical limit.

This objective is attained by the invention which provides an ice cream-making machine characterized by an at least double advance movement of the mold-pulling chain, and by dosing, stick-inserting, and drawing-out devices which are doubled in number.

In this way, during a single shot, the mold rows are moved two steps forwards, and a respective pair of mold rows will be positioned under respective dosing, stick-inserting and lifting-up elements which have been doubled in number to this end.

Thus, with the number of shots being equal, the machine has at least twice as great a productivity as compared with conventional machines.

The freezing tank of the machine according to the invention is conveniently extended in length to allow for the molds remaining the same required time length in the tank during a production run so that freezing of the products can be ensured.

At the exit of the machine, the products are in turn discharged in two rows at a time, to be conveyed to two separate paper wrapping units.

Thus, by the machine according to the invention an opportunity is given to diversify the production without a selection of the outgoing products being necessary.

In fact, by the use of the two dosing devices, different products may be admitted to the molds of the two rows of molds which will be brought in succession to below said dosing devices and which may themselves be of two different designs, with the products of the same type being then discharged towards the same type of wrapping machine.

One embodiment of a machine for making ice creams according to the invention will now be described by way of a non limiting example with reference to the accompanying drawing.

BRIEF DESCRIPTION OF THE DRAWINGS

FIG. 1 is a side view of the machine for making ice creams according to the invention;

FIG. 2 is a plan view of the machine of FIG. 1 with the paper wrapping units being also shown at the exit.

DETAILED DESCRIPTION OF THE PREFERRED EMBODIMENT

Figure 3:
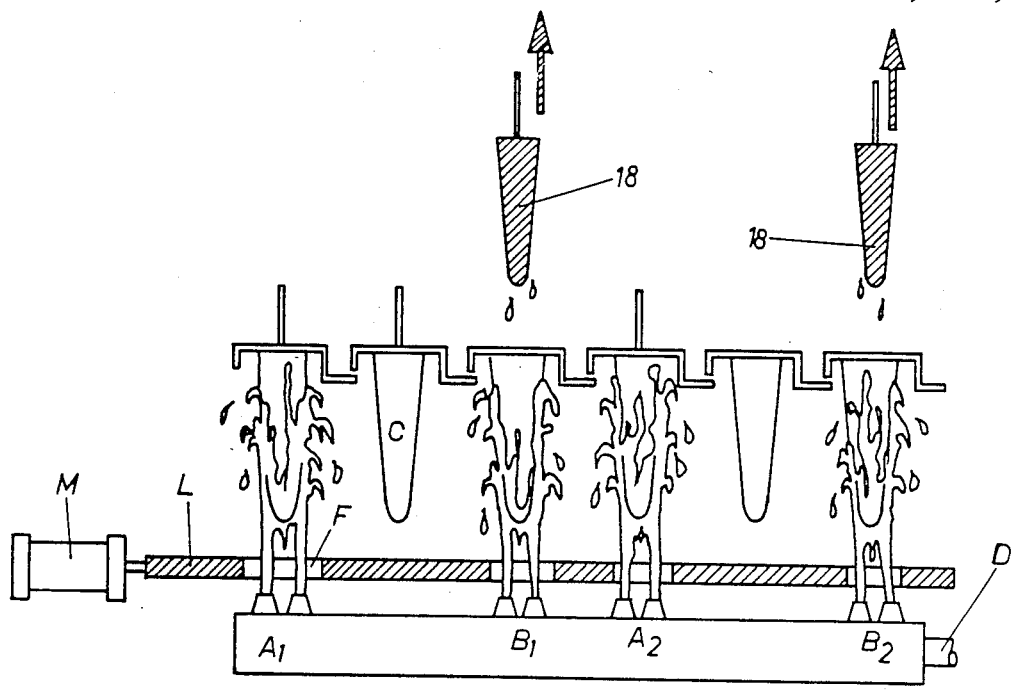
FIGS. 3 and 4 are partial, longitudinal cross-sectional views showing the step of drawing-out or lifting-up the frozen products respectively.

With reference to FIGS. 1–4, there is generally designated by 1 a machine for making ice creams according to the invention. The machine is shown as applied to the production of stick-supported ice creams, namely ice dollies, 'icicles' and the like, but it is to be intended that the machine could be utilized for producing other types of ice creams than those exemplified herein.

The machine includes a freezing tank 2 through which parallel rows of molds are caused to advance intermittently from the right to the left in the drawing, under control of a pull chain 3 effecting an endless path around end sprocket wheels 4 and 5.

Placed at an initial part of, and above the freezing tank 2 is a dosing unit 6 which is arranged to fill with ice cream product, in a liquid state, the molds positioned below the dosing unit.

Provided at an intermediate zone of freezing tank 2 is a stick-inserting unit 7 for inserting sticks in the underlying molds in which the product has already commenced to solidify.

The machine further includes, at the exit from the freezing tank 2, a product-drawing-out or lifting-up unit 8 comprising a series of parallel arranged, equally spaced apart lifting rods which are intermittently operated by a pull chain 9 and which effect drawing and lifting of the ice creams from the molds at an initial zone 10 of the lifting unit, dipping of the ice creams into a covering bath 11, if any, at an intermediate zone 12, and release of the ice creams at an outlet zone 13. Typical lifting up units with a single lifting rod are well known in the art as is described in greater detail in U.S. Pat. No. 63,031,978.

Provided at this outlet zone 13, there is a synchronizing unit 14 which causes the ice creams to be supplied to a paper wrapping unit 15 shown in FIG. 2.

During each advancing step of the mold-pulling chain 3, corresponding dosing, stick-inserting, product-lifting and releasing operations are carried out.

The drawing-out step involves, in turn, one advance step of the pull chain 9 for the lifting rods, the descent and ascent of one lifting rod.

This latter step that imposes mechanical limits upon the number of shots per minute of the machine, namely the number of step-by-step advances of the chain drawing the molds is special.

According to the invention, it has been conceived to arrange for the pull chain 3 to be moved by a double step so as to cause each mold row to be displaced two steps forward per shot of the machine.

Since, in this way, the molds would remain for a shorter overall time in the freezing tank 2, it has been necessary to extend in length the tank 2 in order to enable the molds to be maintained for substantially the same required length of time therein, thereby to ensure that properly frozen products be obtained.

The dosing unit 6 consists of two dosing devices 16 each arranged to fill with product the molds of a respective row of molds placed beneath.

In a like manner, the stick-inserting unit 7 has two stick-inserters 17 for inserting sticks into the molds of two respective rows of molds therebeneath.

The two dosing devices 16 and the two stick inserters 17 are preferably arranged to operate on molds of adjacent rows of molds.

Likewise, the pull chain 9 for the lifting rods is caused to move by a double step, in order to permit two lifting rods to move down and up again for lifting the products contained in the molds of two underlying rows of molds at their coming out of the freezing tank 2.

Owing to space requirements, the lifting rods cannot operate on two adjacent rows of molds.

Therefore, the pull chain 9 is chosen to have chain loops greater in width than the pull chain 3 for the molds. In this manner, two adjacent lifting rods will operate on respective mold rows which are spaced apart so that two further mold rows can be provided inbetween, as schematically shown in FIG. 1.

This could cause difficulties to be encountered in thawing the product while its being drawn-out, which thawing is obtained by means of two successive water jets directed at a given temperature towards the molds from below these latter.

In particular, during the time the products are drawn out of the molds, they are subjected to a first water jet at a station that may be called as the pre-thawing station, and to a second water jet at a thawing station.

Figure 4:
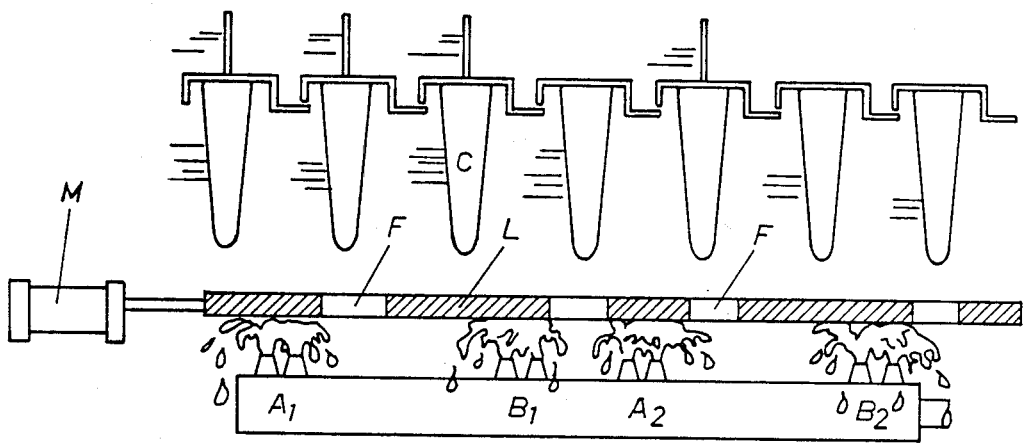

In the machine according to the invention, the prethawing and thawing stations have been doubled in number in order to enable a double drawing-out of products to be obtained, the prethawing and thawing stations being arranged as shown in FIGS. 3 and 4 which are partial, longitudinal cross-sectional views of the machine of the invention where the direction of travel of the molds is reversed with respect to FIGS. 1 and 2.

In particular, shown at A1, A2 are two prethawing stations and at B1, B2 two thawing stations where the products 18 are lifted out of the molds of corresponding mold rows, as viewed in FIG. 3.

Because of the mold-pulling chain 3 advancing by a double step, some of the mold rows do not pass directly from a prethawing station to a thawing station for product drawing-out, but they pass over said stations prior to their being finally lifted up. Thus, for example, the products of the mold row designated by C, FIG. 3, whose prethawing will occur at station A2 and thawing, along with drawing-out, at station B2, have passed over the prethawing station A1 during their progression immediately preceding that in FIG. 3, and will pass over the thawing station B1 on their immediately subsequent progression.

Should the water jet be directed continuously against the molds at both the prethawing and thawing stations, as is the case with conventional machines, said products would undergo too much a thawing, resulting in a loss both in quality and raw product which, once thawed, will be lost on subsequent mold washing operation.

In order to avoid this disadvantage, the invention provides for the molds to be acted upon by water only when they come to a standstill, the water jet being blocked during the progression of the molds.

This is preferably obtained by the use of a plane apertured plane L that is moved in a longitudinal direction by means of an hydraulic jack M.

When the molds are at rest, that is when the products are being drawn out of them, as shown in FIG. 3, the apertures F in plate L permit the water jets from stations A1, A2, B1, B2 to pass therethrough to impinge upon the corresponding rows of molds.

As the molds commence to progress as schematically shown in FIG. 4, the jack M causes the plate L to move to a position blocking the water jets. When mold progression is stopped, a condition like that in FIG. 3 is restored in which two further rows of products are ready for lifting out of their molds.

Obviously, other means than those described above and shown by the drawings may be provided for preventing a jet of water from the water jets from impinging against the products. For example, transversely disposed, pivotable plates could be arranged between the stations A1, A2, B1, B2 and the molds passing over them.

In theory, shutting off of the water flow could be obtained physically by a valve means arranged, for instance, in the water supply conduit D, but such a solution would lead to an uneven distribution and impingement of the water jets upon the molds at each reactuation of the system.

Reverting now to FIGS. 1 and 2, it can be seen that at the end stage 13 of the lifting unit 8, the products, designated schematically at 18, are released as pairs of product rows to be supplied by means of respective synchronizing carriers 19 to associated conveyors 20 for delivery to two individual paper wrapping units 21.

Thus, it can be appreciated that-with the number of shots per minute being equal-the machine according to the invention permits twice as great a productivity to be obtained as compared with a conventional machine.

In theory, productivity of the machine could be further increased by further increasing the number of steps per advance of the mold-pulling chain. As a result, a correspondingly increased number of dosing, stick-inserting, etc..., devices would have to be provided and, above all, a freezing tank correspondingly more extended in length would be necessary in order to allow for the molds remaining the same time length therein as required. All of this would lead to complications in machine construction. Therefore it is believed that, base on experiments carried out, the embodiment described above and shown in the accompanying drawings may be considered as the best possible embodiment for the time being.

A further important advantage of the machine according to the invention is that it permits production to be diversified during the same work cycle. In fact, the two dosing devices 16 may be utilized to admit different products into the molds of the respective mold rows placed below them, which molds could themselves be of two different designs with the products of the same type going to the same respective paper wrapping unit 21 without a selection of products being required.

While one preferred embodiment of an ice cream-making machine according to the invention has been disclosed herein before and shown by way of a non restrictive example in the accompanying drawings, it is intended that several changes as to the details of construction may be made thereto without departing from the spirit and scope of this invention.

We claim:

1. A machine for making ice creams, in particular stick-supported ice creams, such as icicles, ice dollies or sorbets and the like, comprising a plurality of molds arranged in parallel rows; a pull chain; a freezing tank (2) through which said parallel arranged rows of molds are progressing intermittently under control of said pull chain (3); a dosing unit (6); a stick-inserting unit (7); and a product-lifting unit (8) including a further pull chain (9) and parallel lifting rods controlled by said further pull chain (9); the pull chain (3) being arranged to be moved by at least a double step, the dosing unit (6) including two dosing devices (16), the stick-inserting unit (8) having two stick-inserters (17) and the lifting unit (8) controlling two lifting rods for drawing-out and releasing products, the freezing tank (2) being extended in length so as to allow for the molds to remain for the same time length therein as in the case when a single step advancing system is used.

2. The machine for making ice creams according to claim 1, wherein the further pull chain (9) for the lifting rods is also arranged to be moved by a double step.

3. The machine of claim 1, wherein said lifting rods are arranged at such a distance from one another that two consecutive rods can draw the products out of the molds of said rows which are spaced apart to such an extent as to be able to receive two further mold rows inbetween.

4. The machine according to claim 1, and further comprising a plurality of prethawing (A1, A2) and thawing (B1, B2) stations for the products, each of said stations having water jets, said prethawing and said thawing stations being arranged to direct a jet of water from said water jets against the molds respectively prior to and during a product-lifting operation; and means for preventing the jet of water from impining against the products during the time when the products are moving on said pull chain (3).

5. The machine according to claim 4, wherein said preventing means includes an apertured shielding plate (L), and a hydraulic jack (M), said hydraulic jack (M) being formed to effect a reciprocating movement of said plate (L) to thereby block said water jets of said prethawing and thawing stations from impinging against the products.

6. The machine according to claim 4, wherein said preventing means includes a shield movable relative to a respective one of said water jets for blocking a jet of water from said one water jet from impinging against the products.

7. The machine according to claim 4, wherein said water jets are shut off by valve means arranged on a water supply conduit (D).

8. The machine according to claim 1, wherein two synchronizing carriers (19), two conveyor means (20) associated therewith, and two separate paper wrapping units (21) are provided at an exit from said lifting-up unit (8).

9. The machine of claim 1, wherein said dosing devices (16) may admit either the same products or products different in nature to two series of molds which may be equal or different in shape and/or volume.

10. The machine of claim 2, wherein the lifting rods are arranged at such a distance from one another that two consecutive rods can draw the products out of the molds of said rows which are spaced apart to such an extent as to be able to receive two further mold rows inbetween.

11. The machine according to claim 3, and further comprising a plurality of prethawing (A1, A2) and thawing (B1, B2) stations for the products, each of said stations having water jets, said prethawing and said thawing stations being arranged to direct a jet of water from said water jets against the molds respectively prior to and during a product-lifting operation; and means for preventing the jet of water from impacting against the products during the time when the products are moving on said pull chain.

12. The machine according to claim 1, further comprising means (15) for paper wrapping the products at an exit from said lifting-up unit (8).

* * * * *